(12) United States Patent
O'Hara, Jr. et al.

(10) Patent No.: US 7,539,169 B1
(45) Date of Patent: May 26, 2009

(54) DIRECTED ASSOCIATION MECHANISM IN WIRELESS NETWORK ENVIRONMENTS

(75) Inventors: Robert B. O'Hara, Jr., Santa Clara, CA (US); Patrice R. Calhoun, Pleasanton, CA (US)

(73) Assignee: Cisco Systems, Inc., San Jose, CA (US)

( * ) Notice: Subject to any disclaimer, the term of this patent is extended or adjusted under 35 U.S.C. 154(b) by 1014 days.

(21) Appl. No.: 10/611,651

(22) Filed: Jun. 30, 2003

(51) Int. Cl.
*H04W 4/00* (2006.01)
(52) U.S. Cl. .................................................... 370/338
(58) Field of Classification Search ................. 370/338
See application file for complete search history.

(56) References Cited

U.S. PATENT DOCUMENTS

| | | | |
|---|---|---|---|
| 4,398,063 | A | 8/1983 | Hass et al. |
| 5,491,692 | A | 2/1996 | Gunner et al. |
| 5,564,079 | A | 10/1996 | Olsson |
| 5,654,959 | A | 8/1997 | Baker et al. |
| 5,684,860 | A | 11/1997 | Milani et al. |
| 5,940,384 | A | 8/1999 | Carney et al. |
| 6,081,229 | A | 6/2000 | Soliman et al. |
| 6,097,956 | A | 8/2000 | Veeravalli et al. |
| 6,104,928 | A | 8/2000 | Waugh |
| 6,112,095 | A | 8/2000 | Wax et al. |
| 6,115,605 | A | 9/2000 | Siccardo et al. |
| 6,134,448 | A | 10/2000 | Shoji et al. |
| 6,140,964 | A | 10/2000 | Sugiura et al. |
| 6,167,274 | A | 12/2000 | Smith |
| 6,198,935 | B1 | 3/2001 | Saha et al. |
| 6,208,629 | B1 | 3/2001 | Jaszewski et al. |
| 6,212,391 | B1 | 4/2001 | Saleh et al. |
| 6,223,028 | B1 | 4/2001 | Chang et al. |
| 6,240,077 | B1 | 5/2001 | Vuong et al. |
| 6,243,413 | B1 | 6/2001 | Beukema |
| 6,249,252 | B1 | 6/2001 | Dupray |
| 6,259,406 | B1 | 7/2001 | Sugiura et al. |
| 6,269,246 | B1 | 7/2001 | Rao et al. |

(Continued)

FOREIGN PATENT DOCUMENTS

EP    0 930 514 A2    7/1999

(Continued)

OTHER PUBLICATIONS

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

(Continued)

*Primary Examiner*—Seema S. Rao
*Assistant Examiner*—Sai Ming Chan
(74) *Attorney, Agent, or Firm*—Baker Botts L.L.P.

(57) ABSTRACT

Methods, apparatuses and systems enabling a directed association mechanism in wireless computer network environments. In certain embodiments, the directed association functionality described herein can be used in a variety of contexts, such as directing wireless clients to associate with a desired access element or subset of access elements in a wireless network environment. In certain embodiments, the present invention can also be used to increase the efficiency of handing off wireless clients between access elements. The directed association mechanism, in one embodiment, increases the efficiency of establishing wireless connections between wireless clients and access points in a wireless network system.

30 Claims, 6 Drawing Sheets

U.S. PATENT DOCUMENTS

| | | |
|---|---|---|
| 6,275,190 B1 | 8/2001 | Sugiura et al. |
| 6,282,427 B1 | 8/2001 | Larsson et al. |
| 6,286,038 B1 | 9/2001 | Reichmeyer et al. |
| 6,304,218 B1 | 10/2001 | Sugiura et al. |
| 6,338,140 B1 | 1/2002 | Owens et al. |
| 6,414,634 B1 | 7/2002 | Tekinay |
| 6,415,155 B1 | 7/2002 | Koshima et al. |
| 6,441,777 B1 | 8/2002 | McDonald |
| 6,456,892 B1 | 9/2002 | Dara-Abrams et al. |
| 6,473,038 B2 | 10/2002 | Patwari et al. |
| 6,473,413 B1 | 10/2002 | Chiou et al. |
| 6,526,283 B1 | 2/2003 | Jang |
| 6,556,942 B1 | 4/2003 | Smith |
| 6,664,925 B1 | 12/2003 | Moore et al. |
| 6,754,488 B1 | 6/2004 | Won et al. |
| 6,760,318 B1 | 7/2004 | Bims |
| 6,760,671 B1 | 7/2004 | Batcher et al. |
| 6,766,453 B1 | 7/2004 | Nessett et al. ............... 713/171 |
| 6,788,658 B1 | 9/2004 | Bims |
| 6,799,047 B1 | 9/2004 | Bahl et al. |
| 6,810,428 B1 | 10/2004 | Larsen et al. |
| 6,917,819 B2 | 7/2005 | Collins |
| 6,925,069 B2 | 8/2005 | Koos et al. |
| 6,925,070 B2 | 8/2005 | Proctor, Jr. |
| 6,954,641 B2 * | 10/2005 | McKenna et al. ........ 455/435.1 |
| 6,957,067 B1 | 10/2005 | Iyer et al. |
| 6,990,428 B1 | 1/2006 | Kaiser et al. |
| 7,002,943 B2 | 2/2006 | Bhagwat et al. |
| 7,025,209 B2 * | 4/2006 | Hawkins ..................... 209/217 |
| 7,068,644 B1 | 6/2006 | McConnell et al. |
| 7,085,578 B2 | 8/2006 | Ranganathan |
| 7,099,669 B2 | 8/2006 | Sheffield |
| 7,133,909 B2 | 11/2006 | Bahl |
| 7,161,914 B2 | 1/2007 | Shoaib et al. |
| 7,164,663 B2 | 1/2007 | Frank et al. |
| 7,212,837 B1 | 5/2007 | Calhoun et al. |
| 7,269,151 B2 | 9/2007 | Diener et al. |
| 7,277,416 B1 | 10/2007 | Chang et al. |
| 7,313,113 B1 | 12/2007 | Hills et al. |
| 7,366,524 B2 | 4/2008 | Watanabe et al. |
| 2002/0046258 A1 | 4/2002 | Yasushi et al. |
| 2002/0107017 A1 | 8/2002 | Song |
| 2002/0168958 A1 | 11/2002 | Ford et al. |
| 2002/0174335 A1 | 11/2002 | Zhang et al. |
| 2002/0188723 A1 | 12/2002 | Choi |
| 2002/0193116 A1 | 12/2002 | Agrawal et al. |
| 2002/0194384 A1 | 12/2002 | Habetha |
| 2003/0022686 A1 | 1/2003 | Soomro et al. |
| 2003/0023746 A1 | 1/2003 | Loguinov |
| 2003/0033423 A1 | 2/2003 | Okabe et al. |
| 2003/0117985 A1 | 6/2003 | Fujii et al. |
| 2003/0134642 A1 * | 7/2003 | Kostic et al. ................ 455/450 |
| 2003/0135762 A1 | 7/2003 | Macaulay |
| 2003/0139197 A1 * | 7/2003 | Kostic et al. ................ 455/525 |
| 2003/0181215 A1 | 9/2003 | Cromer et al. |
| 2003/0188006 A1 | 10/2003 | Bard |
| 2003/0198208 A1 | 10/2003 | Koos, Jr. et al. |
| 2003/0219008 A1 | 11/2003 | Hrastar |
| 2003/0224787 A1 | 12/2003 | Gandolfo |
| 2004/0003285 A1 | 1/2004 | Whelan et al. |
| 2004/0008652 A1 | 1/2004 | Tanzella et al. |
| 2004/0022222 A1 | 2/2004 | Clisham |
| 2004/0023640 A1 | 2/2004 | Ballal |
| 2004/0047324 A1 | 3/2004 | Diener |
| 2004/0049699 A1 | 3/2004 | Griffith et al. |
| 2004/0076134 A1 | 4/2004 | Barber et al. |
| 2004/0077341 A1 | 4/2004 | Chandranmenon et al. |
| 2004/0103194 A1 * | 5/2004 | Islam et al. ................. 709/225 |
| 2004/0111607 A1 | 6/2004 | Yellepeddy |
| 2004/0176108 A1 | 9/2004 | Misikangas |
| 2004/0198220 A1 * | 10/2004 | Whelan et al. ............. 455/41.1 |
| 2004/0203779 A1 | 10/2004 | Gabara |
| 2004/0203910 A1 | 10/2004 | Hind et al. |
| 2005/0030929 A1 | 2/2005 | Swier et al. |
| 2005/0030945 A1 | 2/2005 | Sarikaya et al. |
| 2005/0060319 A1 * | 3/2005 | Douglas et al. ............... 707/10 |
| 2005/0073979 A1 | 4/2005 | Barber et al. |
| 2005/0114649 A1 | 5/2005 | Challener et al. |
| 2005/0137790 A1 | 6/2005 | Yamada et al. |
| 2005/0207381 A1 | 9/2005 | Aljadeff et al. |

FOREIGN PATENT DOCUMENTS

| | | |
|---|---|---|
| EP | 0 967 818 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| JP | 2004340864 | 12/2004 |
| WO | WO 98/41048 | 12/1999 |
| WO | WO 99/08909 | 7/2000 |
| WO | WO 97/33386 | 10/2000 |
| WO | WO 02/43425 A1 | 5/2002 |
| WO | WO 02/054813 A1 | 7/2002 |
| WO | WO 03/023443 A2 | 3/2003 |

OTHER PUBLICATIONS

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Ekahau Logical Areas-location enabling the Wi-Fi network." Apr. 4, 2003. Ekahau, Inc., Saratoge, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://www.wirelessvalley.com/Products/Optimatic/Optimatic.asp.

"Predictor." Apr. 22, 2003. Wireless Vallley, Austin, TX. URL: http://www.wirelessvalley.com/Products/Predictor/Predictor.asp.

"LANFielder Product Literature." Feb. 10, 2004. Wireless Valley, Austin, TX. URL: http://www.wirelessvalley.com/Assets/brochures/LanFielder.pdf.

Conley, C.. "Securing WLANS with Location-Enabled Networks." Wireless Security Perspectives, vol. 5, No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

PCT Notification of Transmittal of the International Search Report and The Written Opinion of the International Searching Authority, or the Declaration (PCT Rule 44.1), dated Sep. 18, 2006, International Application No. PCT/&S2006/00078.

Dan Simone, 802.1 1k makes WLANs measure up. Networkworld.com Mar. 29, 2004, http://www.networkworld.com/news/tech/2004/0329techupdate.html. Mar. 29, 2004.

Fanny Mlinarsy, metrics and Methods Bring VoWLAN Success, wsdmag.com Mar. 2005 http://www.wsdmag.com/Articles/Print.cft?ArticleID=10003, Mar. 2005.

Rob Tillotson, CoPilot Live GPS Navigation System, Gadgeteer Hands On Review, The Gadgeteer, Apr. 12, 2006, Apr. 12,2006.

International Standard ISO/IEC 8802-11 ANSI/IEEE std. 802.11, 1999 Edition, Part II: Wireless LAN medium Access Control (MAC) and Physical Layer (PHY) specifications, pp. 122-137, 1999.

"tcp-masq" Internet citation http://spped.cis.netu.edu.tw/bandwith/opensource/. Daa Sheet Cisco Aironet 1200 Series Access Point, pp. 1-13, posted Mar. 11, 2002, Mar. 11, 2002.

\* cited by examiner

Fig._1

DIRECTED ASSOCIATION MECHANISM IN WIRELESS NETWORK ENVIRONMENTS

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Paul Dietrich, Robert B. O'Hara, Jr. and David A. Frascone, entitled "Wireless Network System Including Rogue Access Point Detection;"

U.S. patent application Ser. No. 10/409,246 in the name of Robert J. Friday and Alexander H. Hills, entitled "Method And System For Dynamically Assigning Network Resources In Wireless Network;" and U.S. patent application Ser. No. 10/447,735 in the name of Robert B. O'Hara, Jr., Robert J. Friday, Patrice R. Calhoun and Paul Dietrich, entitled "Wireless Network Infrastructure including Wireless Discovery and Communication Mechanism."

FIELD OF THE INVENTION

The present invention relates to wireless computer networks and, more particularly, to methods, apparatuses and systems enabling a directed association mechanism in wireless computer network environments.

BACKGROUND OF THE INVENTION

Wireless computer network environments generally comprise a plurality of wireless access points that, when operating in the infrastructure mode, bridge wireless traffic between a wired computer network and the wireless clients that associate with the access points. A wireless Local Area Network (WLAN) is a wireless communication system with radios having relatively high throughput and short coverage ranges. Many wireless LANs are based on iterations of the IEEE 802.11 standard. When a wireless client initializes or moves into an entirely new coverage area, according to the 802.11 standard, it transmits probe requests to locate access points to which it may associate to establish a wireless connection. Often, the wireless client may detect multiple access points. The 802.11 standard, however, generally leaves it to the wireless client to decide with which access point to associate. That is, a wireless client scans the available channels in the region and listens to the Beacon or Probe Response Frames transmitted by access points in that region. The wireless client stores the RSSI (Received Signal Strength Indicator) of the Beacon or Probe Response Frames and other relevant information, such as BSSID, encryption (on/off), etc. After finishing the scanning procedure, the wireless client generally selects the access point with the maximum RSSI, given that the selected access point satisfies other requirements (typically, BSSID, and WEP encryption) as well. The wireless client leaves or disassociates with the access point when the RSSI falls under a predefined threshold, such as when the user walks away from the coverage area of the access point. This association process, however, often results in uneven loads across access points, where many wireless clients are connected to only a few access points in a wireless environment, while other access points may remain idle or lightly loaded. That is, as discussed above, the wireless clients make association decisions based on what is best for the wireless client as opposed to what is best for the overall efficiency and performance of the wireless network environment.

As discussed above, the wireless client, therefore, acts only with regard to its own self-interest and, thus, will generally associate with the access point based on received signal strength without regard to the load on the access point (e.g., number of wireless clients, data throughput, etc.). The access point largely has no influence over the decision process at the wireless client except to deny the association requested by the wireless client. Denying the association, generally spurs the wireless client to repeat the process of discovering access points by transmitting probe requests and scanning the air for Beacon and Probe Response Frames. Many wireless clients, however, simply select the same access point as the logic the implement does not take account of previous association denials. Accordingly, this circumstance renders load balancing and other resource management tasks more problematic. In addition, even with wireless clients that take account of previous association denials, the discovery of access points by wireless client devices and having to repeat the process when associations are denied takes time, adversely affecting the operational efficiency of the network and degrading the wireless client user's experience.

The prior art for resource management in the area of wireless LANs addresses the problem of allocation of network resources by placing proprietary and non-standard intelligence in both the client and the access point in order to allow the client to make association decisions with information received from the radio access point. In order to be effective, it must limit the network to a homogenous client and infrastructure base, which typically is associated with proprietary software.

One example of such an infrastructure is found in I. Papanikos and M. Logothetis, A Study on Dynamic Load Balance for IEEE 802.11b Wireless LAN, cited as www.wcl.ee.upatras.gr/m-logo/papers/IEEE80211-P41.pdf, (7 pp.) and noted as posted as of at least 12 Nov. 2002. This reference describes an algorithm in which the client makes an association decision based on: the number of clients associated with the radio access point, the received signal strength indication (RSSI) value of the Probe Request received from the client by the radio access point, and the mean RSSI value of the signals received by the radio access point from other clients associated with the radio access point. The paper concludes that the algorithm does not perform well in the presence of hidden nodes and/or highly asymmetric traffic. Despite taking account of loading conditions, the association decisions are still allocated to the wireless client, which assesses a plurality of weighted factors to select an access point with which to associate. The association selection, however, may nevertheless not be appropriate based on the current loading conditions of the network. The selected access point in this instance will then deny the association request, causing the wireless client to repeat the scanning process.

In light of the foregoing, a need in the art for methods, apparatuses and systems that facilitate load balancing and other tasks associated with wireless network environments. A need further exists for a mechanism that reduces the number of association attempts in wireless computer networks. A need further exists for a mechanism that facilitates roaming in wireless network environments. Embodiments of the present invention substantially fulfill these needs.

SUMMARY OF THE INVENTION

The present invention provides methods, apparatuses and systems enabling a directed association mechanism in wireless computer network environments. In certain embodiments, the directed association functionality described herein can be used in a variety of contexts, such as directing wireless clients to associate with a particular access element or subset of access elements in a wireless network environment. In certain embodiments, the present invention can also be used to increase the efficiency of handing off wireless clients between access elements. As discussed below, the directed association mechanism, in one embodiment, increases the efficiency of establishing wireless connections between wireless clients and access points or elements in a wireless network system.

DESCRIPTION OF PREFERRED EMBODIMENT(S)

A. Network Environment Overview

For didactic purposes an embodiment of the present invention is described as operating in a WLAN environment as disclosed in U.S. application Ser. Nos. 10/155,938 and 10/407,357 incorporated by reference herein. As discussed below, however, the present invention can be implemented according to a vast array of embodiments, and can be applied to a variety of WLAN architectures.

Figure 1:
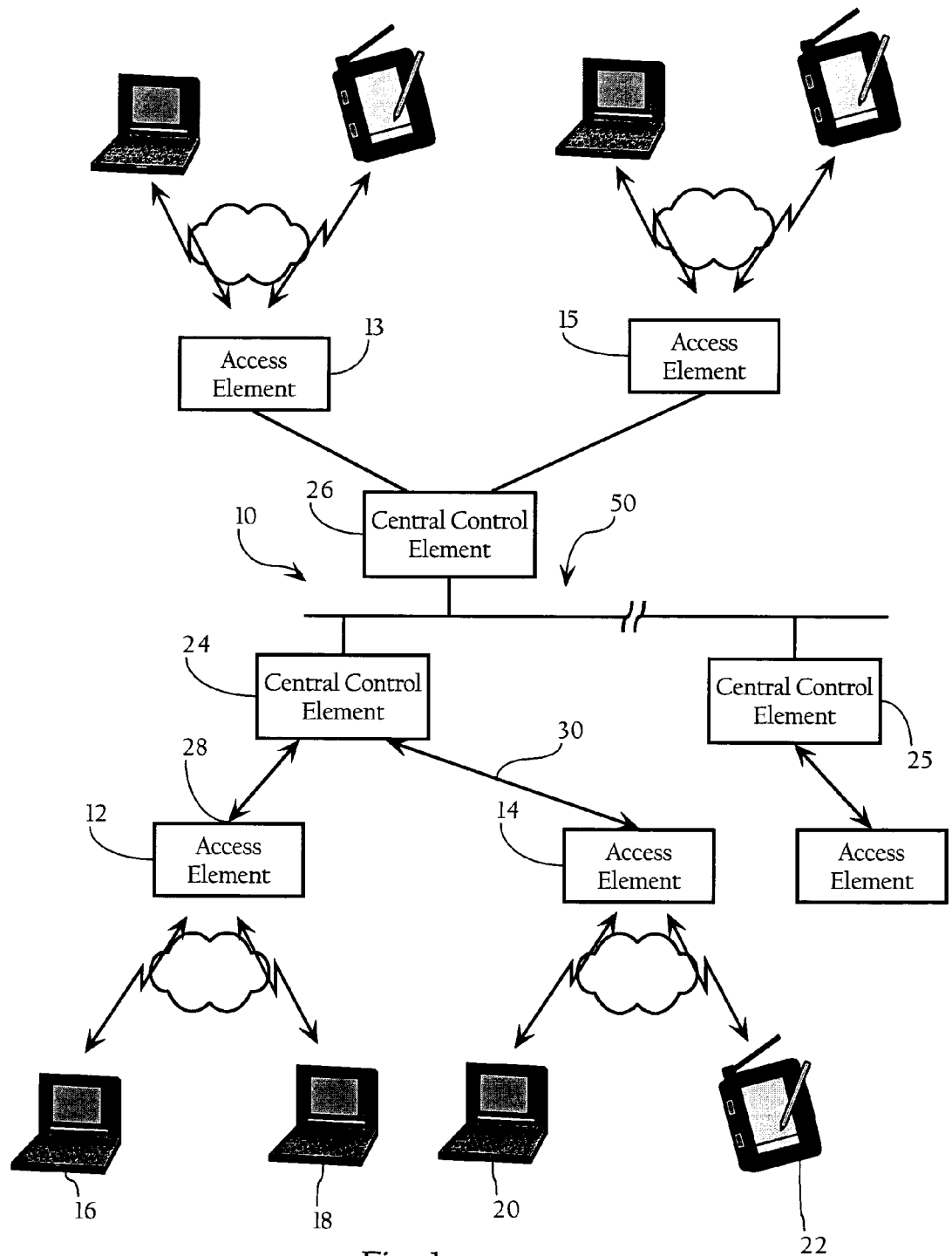
FIG. 1 is a functional block diagram illustrating a wireless network system according to an embodiment of the present invention.
Figure 5:
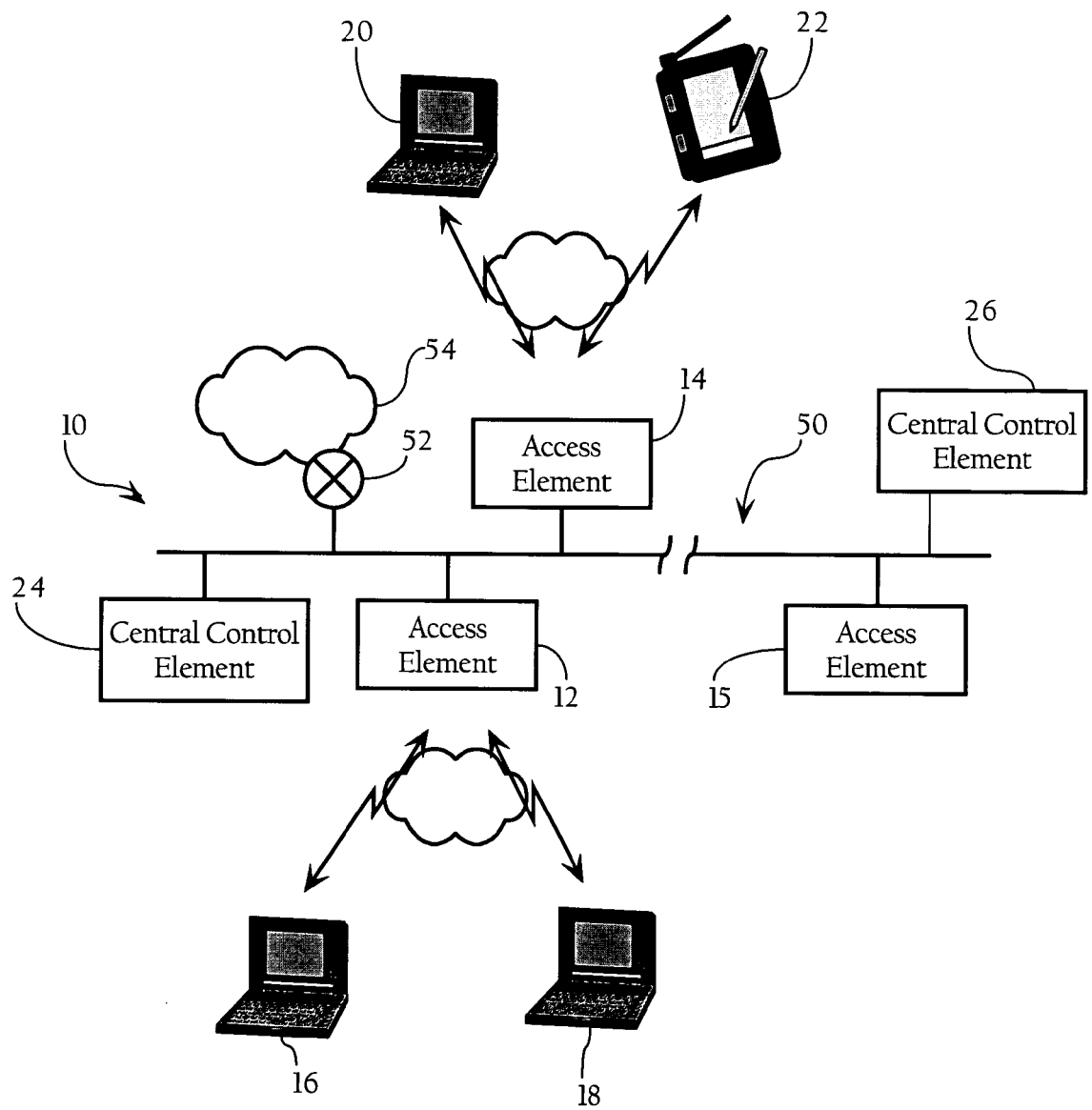
FIG. 5 is a functional block diagram illustrating an alternative wireless network system architecture.

FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 25, 26, and means for communication between the access elements and the central control elements, typically direct line access 28, 30, but potentially a wireless backbone, fiber or other reliable link. As disclosed in U.S. patent application Ser. No. 10/407,357, in another embodiment, the access elements, such as access elements 12, 14 are directly connected to LAN 10 or a virtual local area network (VLAN) for communication with a corresponding central control element 24, 26. See FIG. 5.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. Nos. 10/155,938 and 10/407,357, the access elements 12, 14 and the central control element 24 tunnel network traffic associated with corresponding remote client elements 16, 18; 20, 22 via direct access lines 28 and 30, respectively, or a LAN. Central control element 24 is also operative to bridge the network traffic between the remote client elements 16, 18; 20, 22 transmitted through the tunnel with corresponding access elements 12, 14.

In one embodiment, the access elements, such as access elements 12, 14, include functionality allowing for detection of the strength of the signal received from client remote elements and/or other access elements. For example, the IEEE 802.11 standard defines a mechanism by which RF energy is measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. Again, many chip sets include functionality and corresponding APIs to allow for a determination of signal-to-noise ratios (SNRs) associated with packets received from client remote elements. In one embodiment, access elements 12, 14 include the detected signal strength and/or SNR value associated with a packet in the encapsulating headers used to tunnel the wireless packets to central control element 24. As discussed below, the remote client elements, in one embodiment, include signal attribute detection functionality as well.

As described in the above-identified patent applications, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control elements 25, 26 and associated access elements 13, 15 operate in a similar or identical manner. Other system architectures are possible. For example, U.S. application Ser. No. 10/407,357 discloses a system architecture where the access elements, such as access elements 12-15, are directly connected to LAN segment 10.

Figure 6:
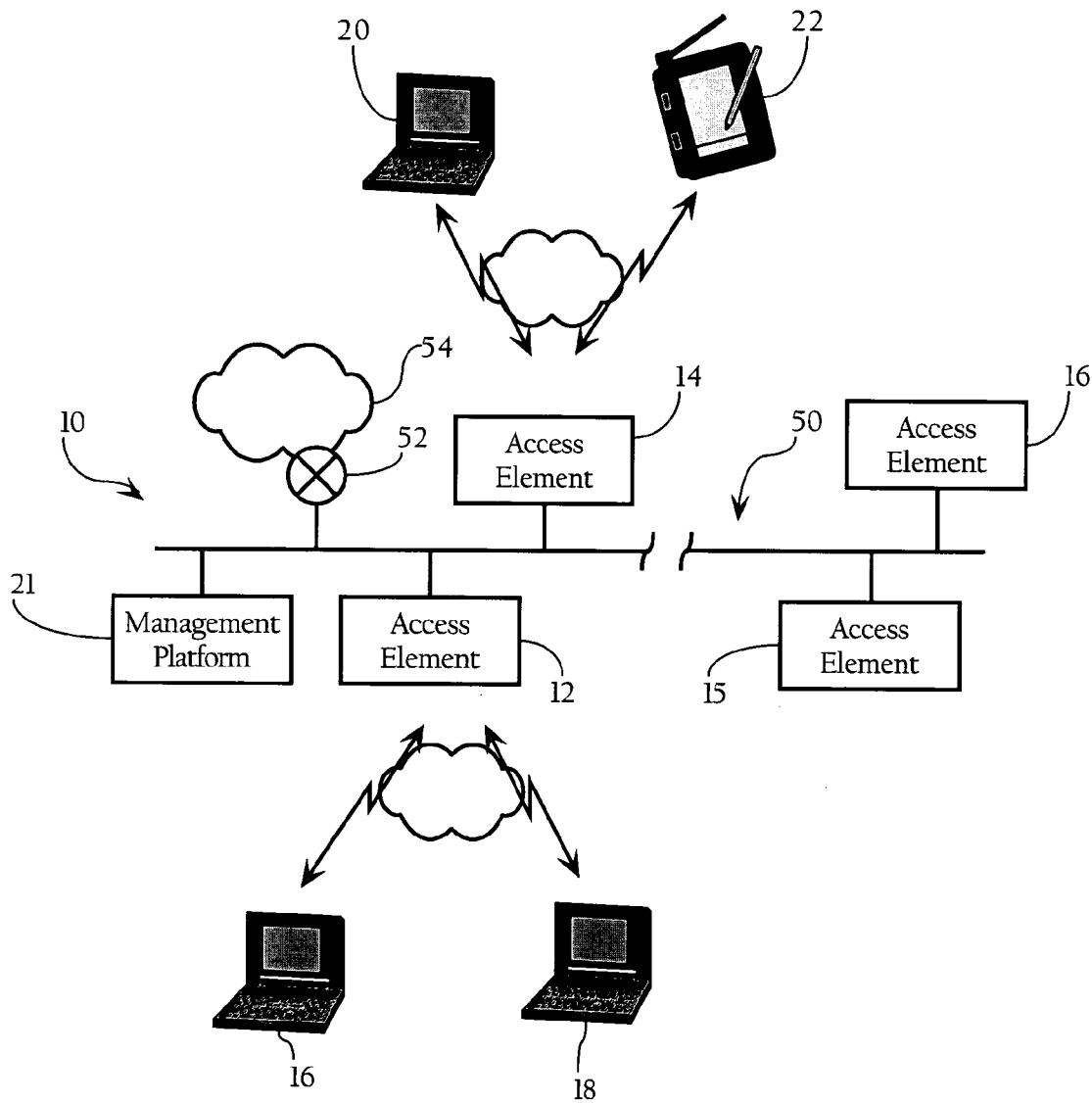
FIG. 6 is a functional block diagram providing yet another alternative wireless network system architecture.

Other system architectures are also possible. For example, in another embodiment, the directed association functionality described herein can be implemented within the context of a single, autonomous access point, which can be configured to communicate with other access points and/or a central management platform 21 via SNMP, HTTP, or other protocols. See FIG. 6.

B. Operation

As the following provides, the directed association functionality described herein can be used in a variety of contexts, such as directing wireless clients to associate with a desired access element or subset of access elements in a wireless network environment. In certain embodiments, the present invention can also be used to increase the efficiency of handing off wireless clients between access elements. These and other objectives will become apparent from the exemplary embodiment described below.

B.1. Directed Association

Figure 2:
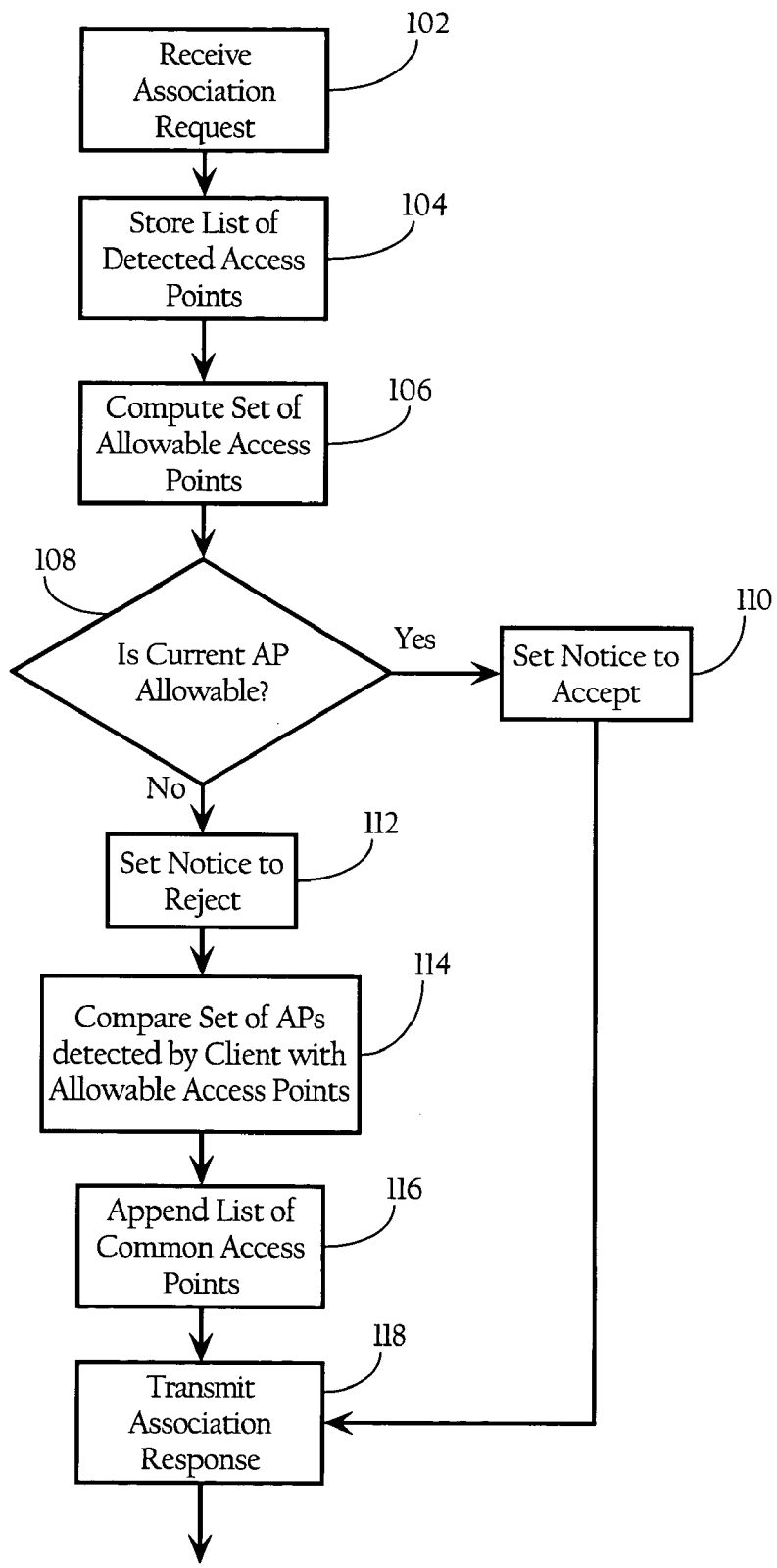
FIG. 2 is a flow chart diagram providing a method enabling a directed association mechanism according to an embodiment of the present invention.
Figure 3:
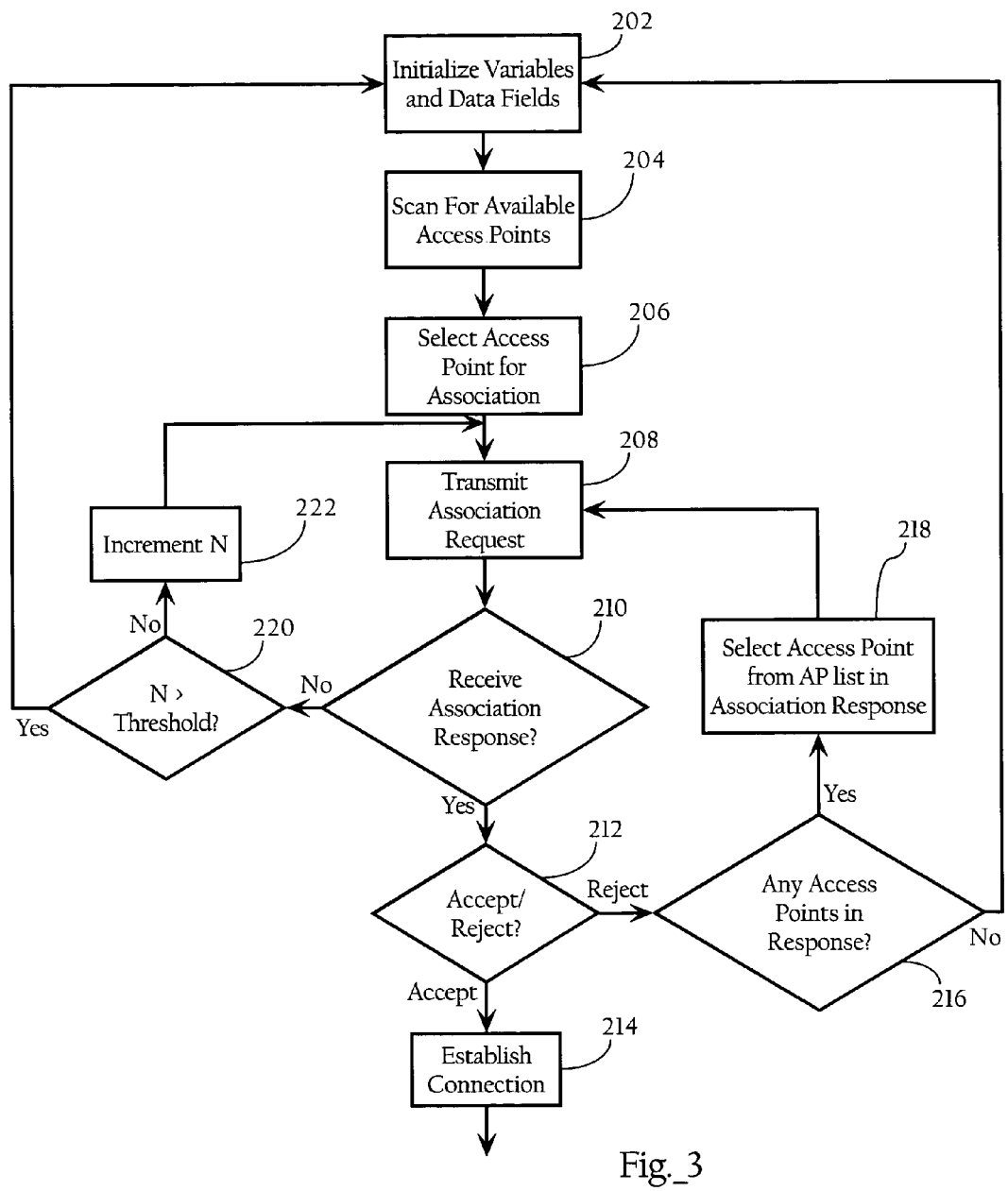
FIG. 3 is a flow chart diagram providing a method, executed by a wireless client, enabling a directed association mechanism according to an embodiment of the present invention.

FIGS. 2 and 3 illustrate methods enabling the directed association mechanism according to an embodiment of the present invention. For didactic purposes, the embodiment described below is described as extensions to the 802.11 wireless communication protocol. As one skilled in the art will recognize, however, the present invention can be applied to any wireless network environment implementing any network communications protocol. As the following provides, FIG. 2 sets forth a method executed by an access point (such as a conventional access point, or an access element 12, 14 operating in connection with a central control element 24). FIG. 3 illustrates a method executed by a wireless client, such as remote client element 16.

B.1.a. Wireless Client Functionality

As FIG. 3 illustrates, upon start up or other event where a wireless client initializes a scan for access points with which to associate, the wireless client initializes variables and data fields associated with the scanning and directed authentication functionality described herein (202). For example, the wireless client may reset an association attempt counter to zero, or reset a table or list of detected access points or elements. The wireless client transmits Probe Requests and then scans its airspace on one to a plurality of operating channels for access points (204). In one embodiment, the wireless client scans all available channels in the region and listens to the Beacon or Probe Response Frames transmitted by access elements 12, 14, for example, in that region. The wireless client stores the RSSI (Received Signal Strength Indicator) of the Beacon or Probe Response Frames and other relevant information, such as BSSID, encryption (on/off), etc. After finishing the scan, the wireless client, in one embodiment, uses conventional processes to select an access element 12 or 14 with which to initially associate (206). For example, as discussed above, the wireless client can select the access element with the maximum RSSI, given that the selected access element covers other requirements (usually the BSSID, WEP encryption) as well. Of course, other selection algorithms can be used as well, whether or not involving extensions to the 802.11 or other applicable wireless protocol.

After selection of an access element, the wireless client transmits an association request (208) to the selected access element. In one embodiment, the wireless client includes a list of access elements (identified, in one embodiment, by MAC address and BSSID) detected during the scan. In one embodiment, the list is embodied in a table which also includes the RSSI values detected during receipt of either Beacon or Probe Response Frames. In one embodiment, the list or table of access elements is ordered according to a preference computed by the wireless client. In 802.11 environments, the wireless client may first transmit an authentication request and receive an authentication response (not shown in FIG. 2 or 3). As FIG. 3 illustrates, the wireless client, in one embodiment, waits a threshold period of time for an association response from the selected access element (210). If no response is received, the wireless client repeats the process a configurable number (N) times (220, 222). If after N attempts, the selected access element does not respond, the wireless client reinitializes the access element scan.

If the access element responds, the wireless client determines whether the association response includes an acceptance notification or a rejection notification (212). If the access element accepts the requested association, the wireless client establishes or completes the wireless connection (214) according to the applicable wireless protocol. If the access element rejects the requested association, the wireless client scans the association response to determine whether it identifies alternative access elements with which to associate (see below). If so, the wireless client selects from the identified access element(s) and transmits an association request to the selected access element (218). As discussed in more detail below, generally speaking the newly requested association should be accepted as the list of alternative access elements was computed by the wireless network system as being available to the wireless client.

B.1.b. Access Element/Central Control Element Functionality

FIG. 2 sets forth a method, according to an embodiment of the present invention, executed on the access point side of the wireless network environment. That is, the method described herein may be performed by an access element 12 operating in connection with a central control element 24, or by a conventional access point architecture where the data link layer functions are not distributed between two components. See FIG. 6. For didactic purposes, the embodiment described herein operates in a distributed, hierarchical wireless network environment including at least one central control element 24 and a plurality of access elements 12, 14, etc. Omitted from FIG. 2 is a description of other data link layer functionality not immediately relevant to the present invention, such as the transmission of Beacon or Probe Response Frames by the access elements.

As FIG. 2 provides, when an access element 12 receives an association request from a wireless client (102) it tunnels the association request to central control element 24. The central control element 24, in one embodiment, stores, in association with an identifier (e.g., MAC address) of the wireless client, a list of access elements that either detected the wireless client (e.g., by detecting a probe request) or a list of access elements detected by the wireless client provided in the association request (e.g., by receiving Beacon or Probe Response Frames during its scan) (104). More specifically, as discussed above, in one embodiment, the association request includes a list of access elements detected by the wireless client and may include other information such as RSSI or other signal related values (e.g., Signal-to-Noise Ratio, etc.). In another embodiment, the central control element 24 by virtue of managing other access elements, such as access element 14, and being able to communicate with other central control elements, such as central control element 26, can compile a list of access elements that detected the Probe Requests of the wireless client. This list can also be augmented to include additional information such as the RSSI or other signal attributes associated with the Probe Requests. In one embodiment, the central control elements 24, 25, 26 are configured with the computer network addresses (e.g., MAC address, IP address, etc.) of the other central control elements to exchange the wireless client identifiers of detected wireless clients, as well as which access element(s) detected the wireless clients. In one embodiment, the central control elements 24, 25, 26 maintain this information in a table or other suitable data structure and synchronize the data structure with other central control elements as appropriate. In addition, the central control elements 24, 25, 26 can also monitor, and exchange with other central control elements, the load (e.g., number of clients, data throughput, duty cycle, etc.) associated with the access elements. Other load balancing or decisional criteria can include the other tasks an access element is called upon to perform, such as rogue access point detection, as disclosed in U.S. application Ser. No. 10/407,370. In one embodiment, there is a central or master control element operative to perform the global load balancing computations for the entire wireless network system. In another embodiment, the central control elements are operative to synchronize load and other operational data with each other, such that each central control element can perform the load balancing or other decisional computations associated with identifying allowable access elements. In another embodiment, the wireless client can be configured to maintain its list of detected access elements locally and then compare its list to the list of allowable access elements returned in the association response in making its selection.

As FIG. 2 shows, central control element 24 then computes a set of allowable access elements with which the wireless client can associate. The set of allowable access elements may be computed according to any suitable algorithm or process, incorporating various factors and criteria, configured to achieve a variety of objectives. For example, the set of allowable access elements may be computed according the load balancing functionality disclosed in U.S. application Ser. No. 10/409,246. Other load balancing algorithms may also be used. In addition, the set of allowable access elements may be computed with regard to other factors, such as statically defined permissions based on wireless client MAC addresses, security policies, and the like. For example, wireless clients associated with guests or visitors to an enterprise may be forced to associate with only a subset of access elements. In other embodiments, the set of allowable access elements may be configured with respect to additional criteria, such as the duty cycle associated with rogue access point detection or other tasks where a given access element goes off channel to perform a function.

In yet other embodiments, the list of allowable access elements may be computed with respect to geographic/location considerations, as well as detected radio-frequency connectivity or overlap among access elements. For example, as disclosed in U.S. application Ser. No. 10/447,735, the access elements can be configured to exchange so-called neighbor messages to allow the central control elements or a central management platform to map the RF connectivity of the access elements. The set of allowable access elements can be reduced to the set of access elements having RF connectivity within a given signal strength threshold to the access element initially selected by the wireless client. In another embodiment, the central control elements can be configured with geographic or other location information relating to the access elements and select or further filter the set of allowable access elements based on geographic proximity to the access element initially selected by the wireless client.

In one embodiment, if the current access element 12 is included in the set of allowable access elements (108), then the central control element 24 sets the notification value in the association response to "accept" (110) and transmits the association response (118). Optionally, the association response may also include the set of other allowable access elements. However, if the current access element is not in the allowable set, the central control element 24 sets the notification value in the association response to "reject" (112). The central control element 24 then compares the set of access elements detected by (or detecting) the wireless client, see above, to the computed set of allowable access elements. If there is any overlap between the two sets, the central control element 24 appends the list of common access elements (in one embodiment, identified by MAC address) to the association response (116) and transmits the association response to the wireless client (118). As discussed above, the wireless client can then use this list of access elements in subsequent association attempts, being, in one embodiment, virtually guaranteed (assuming the association request is transmitted in a sufficiently small period of time from the response) that an association request directed to an access element on this list will be accepted. As one skilled in the art will recognize, this protocol greatly reduces the time inherent in having to repeat the scan for access elements only to attempt to associate with the same access element, or another access element, that will deny the association.

In one embodiment, the table or other data structure included in the association response can include a variety of information. In one embodiment, the table can include the access element identifier, such as MAC address, and the BSSID of the access element. The table can also include other parameters, such as the operating channel of the access element, as well as operational parameters and characteristics, such as current load, and duty cycle. In one embodiment, the association response can also include other information, such as the RSSI values of the Probe Requests detected at each access element, to allow the wireless client to base its selection, at least in part, on this metric.

B.2. Directed Handoff

Once the wireless client is associated, the wireless network system, in one embodiment, can operate to facilitate handoffs of the wireless client between different access elements. For example, assume for didactic purposes that the data throughput load at access element 12 has risen above a threshold level, causing central control element 24 to decide that at least one currently-associated wireless client must be handed off to another access element.

Figure 4:
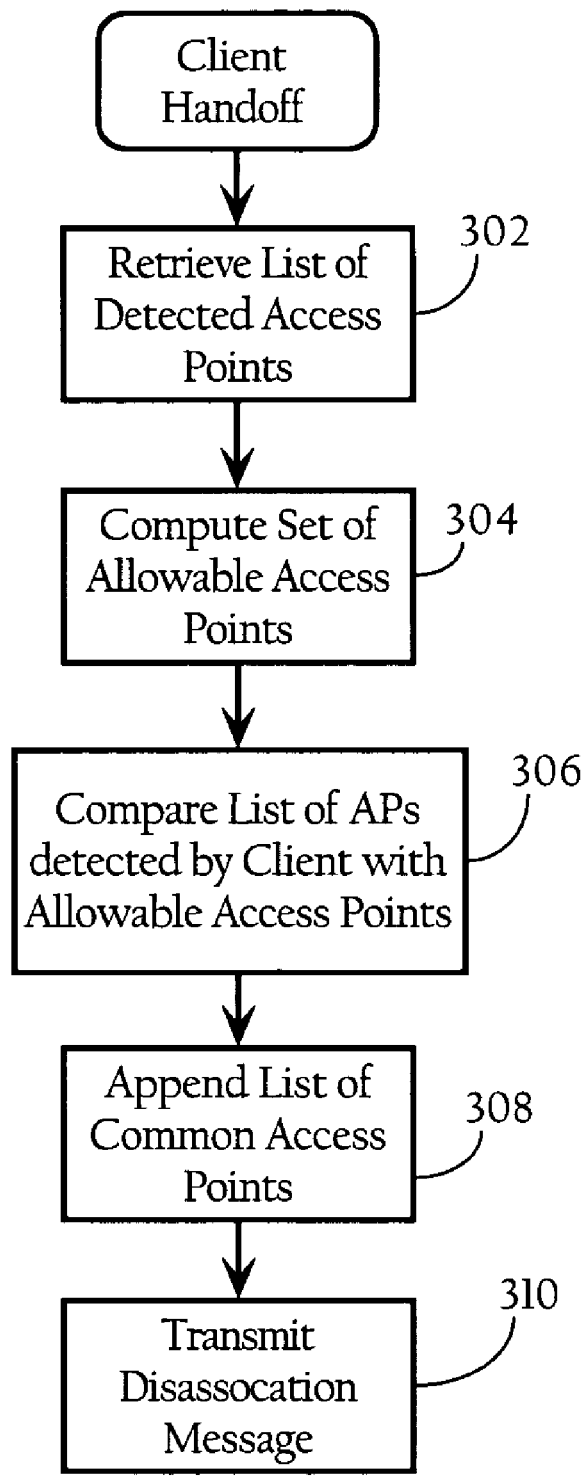
FIG. 4 is a flow chart diagram setting forth a method, according to an embodiment of the present invention, enabling directed handoffs of wireless clients.

FIG. 4 illustrates a method enabling the directed handoff of the wireless client to another access element. In one embodiment, when the decision is made to initiate the handoff of a currently-associated wireless client, the central control element 24 first retrieves the list of access elements originally detected by the wireless client during the initial scan (see Section B.1., supra) (302). As above, the central control element 24 then computes a set of allowable access elements (304), in one embodiment, by applying a load balancing algorithm, and compares the set of allowable access elements to the set of detected access elements (306). The central control element 24 appends the set of overlapping access element identifiers to a disassociation message (308) and transmits the disassociation message to the wireless client (310). As above, the wireless client can use the list of access element identifiers to select an access element and associate with the selected access element.

The invention has been explained with reference to specific embodiments. Other embodiments will be evident to those of ordinary skill in the art. For example, the present invention can also be applied to WLAN architectures beyond the hierarchical WLAN architecture described above. For example, in another embodiment, the directed association functionality described herein can be implemented within the context of a single, autonomous access point, which can be configured to exchange necessary information with other similarly configured access points and communicate with such access points over the wired network to coordinate configuration and other management tasks. See FIG. 6. This distributed system of autonomous access points can be managed by a central network management platform 21 operative to distribute configuration information to the access points. In addition, although the embodiments described above, involve extensions to the 802.11 wireless networking protocol, the directed association mechanism can be applied to any suitable wireless network environment. It is, therefore, intended that the claims set forth below not be limited to the embodiments described above.

What is claimed is:

1. An apparatus for use in a wireless network environment and enabling a directed association of wireless clients to one of a plurality of wireless network access devices, comprising
    a transmit/receive unit for wireless communication with at least one remote client element,
    a network interface for communication with devices over a wired computer network, wherein the apparatus is operative to:
        receive an association request from a remote client element, wherein the association request from the remote client element includes a list of one or more wireless network access devices detected by the remote client element during a scan;
        compute a set of allowable wireless network access devices with which the remote client element may associate;
        transmit an association response to the remote client element, wherein the association response identifies at least one of the wireless network access devices common to both the list of one or more wireless network access devices detected by the remote client element during a scan and the computed set of allowable wireless network access devices; and
        establish and maintain, in an access point mode, wireless connections with remote client elements to bridge wireless traffic between the remote client elements and the computer network.

2. The apparatus of claim 1 wherein the wireless network access devices are access points.

3. The apparatus of claim 1 wherein the wireless network access devices are access elements in a wireless network system including hierarchical processing of protocol information.

4. The apparatus of claim 1 wherein the at least one wireless network access device transmitted in the association response is identified by wireless MAC address.

5. The apparatus of claim 4 wherein the at least one wireless network access device is further identified by BSSID.

6. The apparatus of claim 4 wherein the association response further includes the current operating channel association with the at least one wireless network access device.

7. The apparatus of claim 1 wherein the set of allowable wireless network access devices is computed using a load balancing algorithm.

8. The apparatus of claim 7 wherein the apparatus is operative to exchange load data with other apparatuses in the wireless network system.

9. The apparatus of claim 1 wherein the remote client element is operative to transmit probe requests to wireless network access devices, and wherein the apparatus is operative to receive from wireless network access devices in the wireless network system indications that the wireless network access devices detected the probe requests of the remote client element.

10. A wireless network system enabling a directed association mechanism, comprising
    a plurality of access elements for wireless communication with at least one remote client element and for communication with a central control element;
    a central control element for supervising at least one of said access elements, wherein the central control element is operative to manage and control the wireless connections between the access elements and corresponding remote client elements; and
    wherein the access elements are each operative to:
        receive an association request from a remote client element, wherein the association request from the remote client element includes a list of one or more wireless network access devices detected by the remote client element during a scan;
        transmit the association request to a corresponding central control element;
        receive an association response from the central control element; and
        transmit the association response to the remote client element;
    wherein the central control element is operative to:
        receive, via an access element, an association request from a remote client element;
        compute a set of allowable access elements with which the remote client element may associate;
        transmit an association response to the remote client element via an access element, wherein the association response identifies at least one of the access elements common to both the list of one or more wireless network access devices detected by the remote client element during a scan and the computed set of allowable access elements.

11. The system of claim 10 further comprising a computer network, wherein the central control element is coupled to the computer network, and wherein the central control element is operative to
    establish a tunnel with access elements for transmission of wireless traffic associated with corresponding remote client elements, and
    bridge network traffic between the computer network and a remote client element through a tunnel with a corresponding access element.

12. The system of claim 10 wherein the at least one access element transmitted in the association response is identified by wireless MAC address.

13. The system of claim 12 wherein the at least one access element is further identified by BSSID.

14. The system of claim 12 wherein the association response further includes the current operating channel associated with the at least one access element.

15. The system of claim 10 wherein the set of allowable access elements is computed using a load balancing algorithm.

16. The system of claim 15 further comprising at least a second central control element a central control element for supervising at least one of said access elements, wherein the central control element is operative to manage and control the wireless connections between the access elements and corresponding remote client elements; and wherein the central control elements are operative to exchange load data.

17. The system of claim 16 wherein the load data includes the number of remote client elements connected to each access element.

18. The system of claim 16 wherein the load data includes data throughput associated with each access element.

19. The system of claim 16 wherein the wireless client transmits probe requests to the access elements, and wherein the central control elements are operative to identify the access elements detecting the probe requests.

20. The system of claim 19 wherein the central control elements are further operative to compare the identified access elements detecting the probe requests of the wireless client to the set of allowable access elements, and wherein the association response includes at least one allowable access element that also detected probe requests of the wireless client.

21. In a wireless network environment comprising a plurality of wireless network access devices for wireless communication with wireless clients, a method enabling a directed association scheme, comprising
receiving an association request from a wireless client, wherein the association request from the wireless client includes a list of one or more wireless network access devices detected by the wireless client during a scan;
computing a set of allowable wireless network access devices with which the wireless client can associate;
identifying one or more common wireless network access devices common to both the set of allowable wireless network access devices and the list of one or more wireless network access devices detected by the wireless client:
transmitting an association response to the wireless client, wherein the association response includes one or more wireless network access devices common to both the set of allowable wireless network access devices and the list of one or more wireless network access devices detected by the wireless client.

22. The method of claim 21 wherein the at least one wireless network access device transmitted in the association response is identified by wireless MAC address.

23. The method of claim 22 wherein the at least one wireless network access device is further identified by BSSID.

24. The apparatus of claim 23 wherein the association response further includes the current operating channel association with the at least one wireless network access device.

25. The apparatus of claim 21 wherein the set of allowable wireless network access devices is computed using a load balancing algorithm.

26. In a wireless network environment comprising a plurality of wireless network access devices for wireless communication with wireless clients, a method enabling a directed association scheme, comprising
scanning, at a wireless client, for wireless network access devices in a wireless network environment;
selecting, at the wireless client, a wireless network access device identified in the scanning step;
transmitting, from the wireless client, an association request to the selected wireless network access device;
receiving, at the wireless client, an association response from the selected wireless network access device, wherein the association response denies the association request and identifies at least one allowable wireless network access device; and
transmitting, from the wireless client, an association request to one of the at least one allowable wireless network access device.

27. The method of claim 26 wherein the association request includes a list of one or more wireless network access devices detected in the scanning step.

28. The method of claim 26 further comprising storing the wireless network access devices detected in the scanning step.

29. The method of claim 26 wherein the wireless network access devices are access points.

30. The method of claim 26 wherein the wireless network access devices are access elements in a wireless network system including hierarchical processing of protocol information.

* * * * *